(12) United States Patent
Haxhiu et al.

(10) Patent No.: US 11,601,006 B2
(45) Date of Patent: Mar. 7, 2023

(54) CONTROL OF DC VOLTAGE DISTRIBUTION SYSTEM

(71) Applicant: ABB Schweiz AG, Baden (CH)

(72) Inventors: Arber Haxhiu, Espoo (FI); Sami Kanerva, Vantaa (FI); Ricky Riyadi Chan, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/663,837

(22) Filed: Oct. 25, 2019

(65) Prior Publication Data

US 2020/0136423 A1 Apr. 30, 2020

(30) Foreign Application Priority Data

Oct. 29, 2018 (EP) .................................. 18203078

(51) Int. Cl.
*H02J 7/34* (2006.01)
*H01M 8/04858* (2016.01)
(Continued)

(52) U.S. Cl.
CPC ........... *H02J 7/34* (2013.01); *H01M 8/04873* (2013.01); *H01M 8/04888* (2013.01);
(Continued)

(58) Field of Classification Search
CPC ....................................................... H02J 7/34
(Continued)

(56) References Cited

U.S. PATENT DOCUMENTS

| 4,883,724 A | * | 11/1989 | Yamamoto | ........ H01M 8/04597 429/431 |
| 6,847,127 B1 | * | 1/2005 | Lee | ........ B60L 58/12 290/40 C |

(Continued)

FOREIGN PATENT DOCUMENTS

| JP | 2016019353 A | 2/2016 |
| JP | 2017091882 A | 5/2017 |

OTHER PUBLICATIONS

European Patent Office, Extended Search Report issued in corresponding Application No. 18203078.3, dated Feb. 22, 2019, 10 pp.
(Continued)

*Primary Examiner* — Adi Amrany
(74) *Attorney, Agent, or Firm* — Leydig, Voit & Mayer, Ltd.

(57) ABSTRACT

A DC voltage distribution arrangement and method of controlling a DC voltage distribution system, the DC voltage distribution system including a DC voltage bus, a fuel cell electrically connected to the DC voltage bus, an energy storage and an energy storage converter, wherein the input of the energy storage converter is connected to the energy storage and the output of the energy storage converter is connected to the DC bus. The method comprises providing a DC voltage reference for the energy storage converter, the energy storage converter controlling the voltage of the DC voltage bus by providing power from the energy storage or to the energy storage, detecting power flow of the energy storage converter, and changing the DC voltage reference on the basis of the detected power flow to change the power taken from the fuel cell.

11 Claims, 3 Drawing Sheets

(51) Int. Cl.
*H01M 16/00* (2006.01)
*H02J 1/10* (2006.01)
*H02M 3/158* (2006.01)

(52) U.S. Cl.
CPC ... *H01M 8/04932* (2013.01); *H01M 8/04947* (2013.01); *H01M 16/006* (2013.01); *H02J 1/10* (2013.01); *H02M 3/158* (2013.01); *H02J 2300/30* (2020.01)

(58) Field of Classification Search
USPC .......................................................... 307/72
See application file for complete search history.

(56) References Cited

U.S. PATENT DOCUMENTS

| 2006/0029846 | A1 | 2/2006 | Konoto et al. | |
|---|---|---|---|---|
| 2006/0220609 | A1* | 10/2006 | Konoto | H02J 7/34 320/101 |
| 2007/0275276 | A1* | 11/2007 | Saeki | H01M 8/04589 429/431 |
| 2013/0038120 | A1* | 2/2013 | Mimatsu | H01M 16/006 307/9.1 |
| 2013/0176759 | A1* | 7/2013 | Kaneko | H02M 7/537 363/97 |
| 2015/0111122 | A1* | 4/2015 | Matsusue | H01M 8/04589 429/432 |
| 2017/0166081 | A1* | 6/2017 | Kwon | B60L 58/32 |
| 2018/0241095 | A1* | 8/2018 | Nozaki | B60L 58/40 |

OTHER PUBLICATIONS

Becherif et al., "Advantages of variable DC bus voltage for Hybrid Electrical Vehicle," Vehicle Power and Propulsion Conference, IEEE, Sep. 1, 2010, pp. 1-6.

Jin et al., "Frequency-Division Power Sharing and Hierarchical Control Design for DC Shipboard Microgrids with Hybrid Energy Storage Systems," 2017 IEEE Applied Power Electronics Conference and Exposition, Mar. 26, 2017, pp. 3661-3668.

* cited by examiner

CONTROL OF DC VOLTAGE DISTRIBUTION SYSTEM

FIELD OF THE INVENTION

The invention relates to DC voltage distribution systems, and particularly to DC voltage distribution systems using fuel cells as an energy source.

BACKGROUND OF THE INVENTION

In certain environments and uses DC voltage distribution system has been found to be an efficient structure. For example, when power is fed to multiple of loads in an isolated system, a DC voltage bus may be a suitable solution. In such a case DC power is fed to a DC voltage bus from a power source, and the loads are fed from the DC voltage bus using separate converter devices, such as inverters.

Typically the DC bus voltage is kept fixed at preset value apart from a small voltage droop for load sharing between conventional electric generators and/or energy storage devices. Varying the voltage is usually not desired because devices connected to the DC bus are designed to operate optimally at a certain voltage level. Varying the DC bus voltage would cause extra heating in certain equipment, for example passive filters. The extra heating in passive components occurs due to current ripple from the power converters. The higher the DC bus voltage is compared to converter output voltage, the higher is the ripple current. However, to keep the voltage steady at the fixed value, either power generators are required to operate at constant voltage or active rectifiers are required.

With conventional electric generators powered by combustion engines, terminal voltage can be regulated through generator field current. This makes voltage regulation simple without the need of extra expensive devices. However, with fuel cells, the output voltage on fuel cell terminals varies based on its loading and it cannot be controlled without devices for active voltage regulation, such as DC to DC power converters. Due to considerably variation in fuel cell voltage, the operation of common DC bus with a fixed voltage causes significant disadvantages. Main disadvantages of fuel cells operated with fixed DC bus voltage through DC to DC converters is extra cost and footprint due to over-dimensioning of DC to DC converters and current chokes, losses and noise caused by high frequency switching. Over-dimensioning occurs because power converter needs to be dimensioned to both maximum current and maximum voltage. However, when fuel cell is operating at maximum current, its voltage can be down to 50% of maximum voltage.

In conventional systems which employ fuel cells, a DC to DC converter is used to boost the voltage of the fuel cell. This means that the maximum output voltage of the fuel cell must be lower than the fixed DC voltage. As the fuel cell output voltage is at the highest at low loads, the output voltage is significantly lower at full power. Therefore, to get high power out of the fuel cells, the voltage drop has to be compensated with higher current.

One problem of the known devices operated with fuel cells is that the DC to DC converter causes losses to the system as the converter is operated constantly.

BRIEF DESCRIPTION OF THE INVENTION

An object of the present invention to provide a method and an arrangement for implementing the method so as to overcome the above problem. The object of the invention is achieved by a method and an arrangement which are characterized by what is stated in the independent claims. The preferred embodiments of the invention are disclosed in the dependent claims.

The invention is based on the idea of employing control system which enables the DC bus voltage to be changed. Due to the control system the dimensioning of the DC to DC converter with respect to the output voltage of the fuel cell can be made more optimal. In the control, the power from the fuel cell is controlled by changing the reference voltage of the DC bus, and controlling the DC voltage using power from an energy storage.

An advantage of the method and the arrangement of the invention is that the fuel cell can be operated more efficiently. In a certain operational range the fuel cell can be connected directly to the DC bus thus eliminating the losses of DC to DC conversion. Further, the invention enables to dimension the DC to DC converter in a different manner such that the efficiency of the system is increased.

According to an embodiment of the invention, the DC to DC converter used to convert the fuel cell voltage is able to increase and decrease the voltage from the fuel cell. The fuel cell voltage can therefore be dimensioned to be much higher than if the DC to DC converter could operate only as a boost converter.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
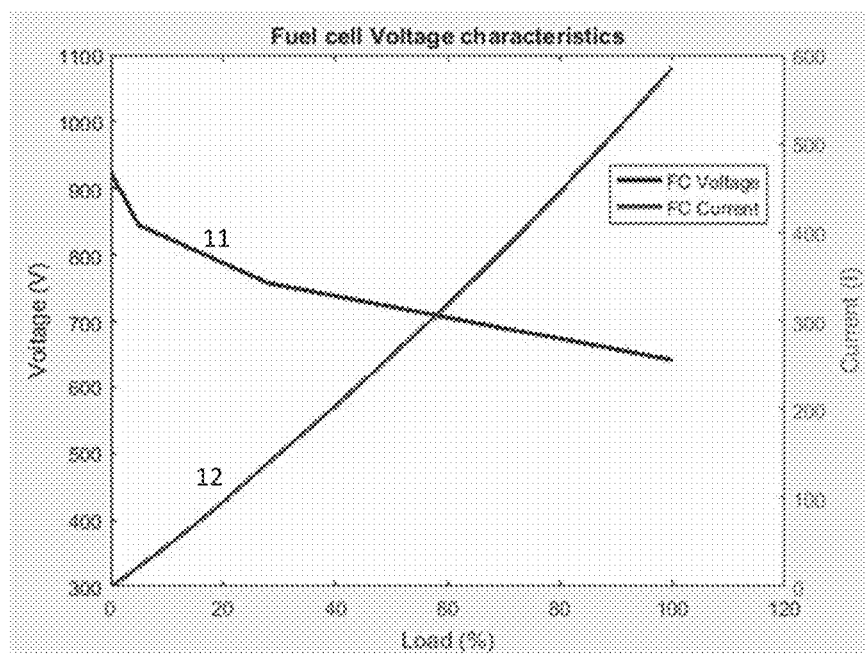
FIG. 1 shows an example of characteristic curve of a fuel cell.

FIG. 1 is a general representation of the characteristics of a typical fuel cell. FIG. 1 is to illustrate the dependence of the output voltage 11 of the fuel cell with respect to the loading of the cell. When a fuel cell is not loaded, i.e. the current 12 from the fuel cell is zero, the voltage of the fuel cell is at the maximum value. When current is drawn from the fuel cell, the voltage starts to decrease quite rapidly. When the current is at its maximum value, the voltage of the fuel cell has dropped to approximately two thirds of the open circuit voltage.

Figure 2:
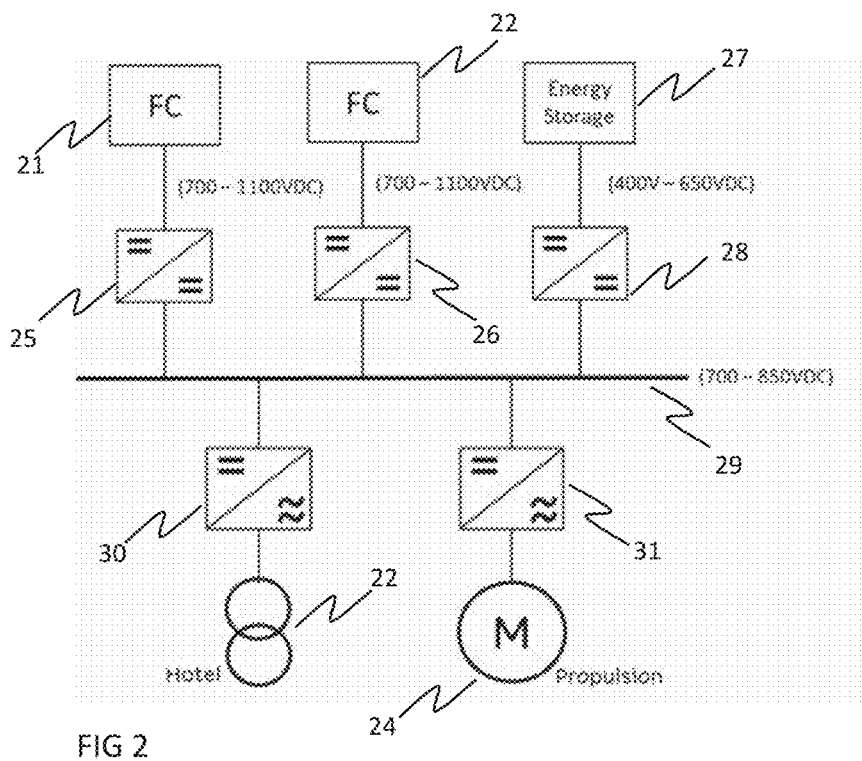
FIG. 2 shows an example of DC power distribution system.

FIG. 2 shows an example of a variable DC voltage distribution system. In the example two fuel cells 21, 22 are used for producing power to the loads 23, 24 connected to a DC voltage bus 29 of the distribution system. Both fuel cells are connected to the DC bus using respective DC to DC converters 25, 26. FIG. 2 further shows an energy storage 27 which is also connected to DC bus 29 through a DC to DC converter 28 denoted as energy storage converter. The loads or consumers in the example are shown to the ones using alternating voltage, and the loads are connected to the DC bus using DC to AC converters 30, 31.

In the method of controlling a DC voltage distribution system, the DC voltage distribution system comprises a DC voltage bus 29, a fuel cell 21, 22 electrically connected to the DC voltage bus and an energy storage 27 and an energy storage converter 28. The input of the energy storage converter is connected to the energy storage and the output of the energy storage converter is connected to the DC bus. In FIG. 2, two fuel cells are shown to be connected electrically to the DC voltage bus, and the electrical connection is trough DC to DC converters. Further, FIG. 2 shows the DC bus as a single line. It is, however, clear, that a DC bus consists of two electrical conductors which are typically denoted as positive and negative conductors.

In the method of the invention, a DC voltage reference is provided for the energy storage converter 28, the energy storage converter controlling the voltage of the DC voltage bus by providing power from the energy storage or to the energy storage. The energy storage converter is a bi-directional DC to DC converter. The purpose of the energy storage is to respond to load changes quickly such that in the beginning of a load change, power is fed from the energy storage through the DC voltage bus to the load. When load is increased, the DC voltage of the voltage bus decreases. However, the energy storage converter 28 is set to control the voltage of the DC voltage bus, power from the energy storage is fed to the DC voltage bus and thereby the voltage is kept at the controlled level. Similarly, when the power taken by the loads or consumers decrease, the DC voltage of the DC voltage bus would increase without the control by the energy storage converter. Thus when the DC voltage is increasing, the energy storage converter feeds power to the energy storage and thereby controls the DC voltage to a set value.

According to the method, power flow of the energy storage converter is detected, and based on the detected power flow the DC voltage reference is changed. The change of the DC voltage reference changes also the amount of power taken from the fuel cell.

The detection of the power flow is preferably based on the current from the energy storage or on the change of charging level of the energy storage. When current is drawn from the energy storage, the energy storage converter feeds power to the DC voltage bus to keep the voltage at the set value. When, on the other hand, the direction of the current is towards the energy storage, power is fed from the DC voltage bus to the energy storage. The direction of current thus indicates whether the load of the DC distribution system has increased or decreased. Similarly, if the charging level of the energy storage is monitored, the power flow of the energy storage can be detected. If the charging level is increased, the load has decreased and if the charging level is decreased, the load has increased.

When power flow of the energy storage converter is detected, the DC voltage reference given to the energy storage converter is changed. When the energy storage converter implements the changed voltage reference, the DC voltage of the DC voltage bus changes and this change leads to change in the power taken from the fuel cell. As mentioned above, the voltage of the fuel cell determines the amount of current drawn from the fuel cell. That is, if the DC voltage of the DC voltage bus decreases, the current and power from the fuel cell is increased. Similarly, if the DC voltage of the DC voltage bus increases, the current and power from the fuel cell is decreased. When operating in a suitable voltage area, the fuel cell DC to DC converter can be switched to a mode in which the converter is not changing the voltage level but the output voltage can be connected directly to the DC voltage bus. During low loads the fuel cell converter converts the output voltage of the fuel cell to a level which corresponds to maximal acceptable voltage value of the DC voltage bus. When the load increases, the fuel cell voltage decreases below the maximal acceptable voltage value, and the fuel cell converter can switch the voltage directly to the DC voltage bus without any conversion. Once the voltage of the fuel cell is below the highest allowable voltage, the fuel cell voltage is floating with the voltage of the DC voltage bus. According to an embodiment, the fuel cell is connected electrically to the DC voltage bus through a DC to DC converter, which is preferably a voltage decreasing converter, such as a buck-converter.

Figure 4:
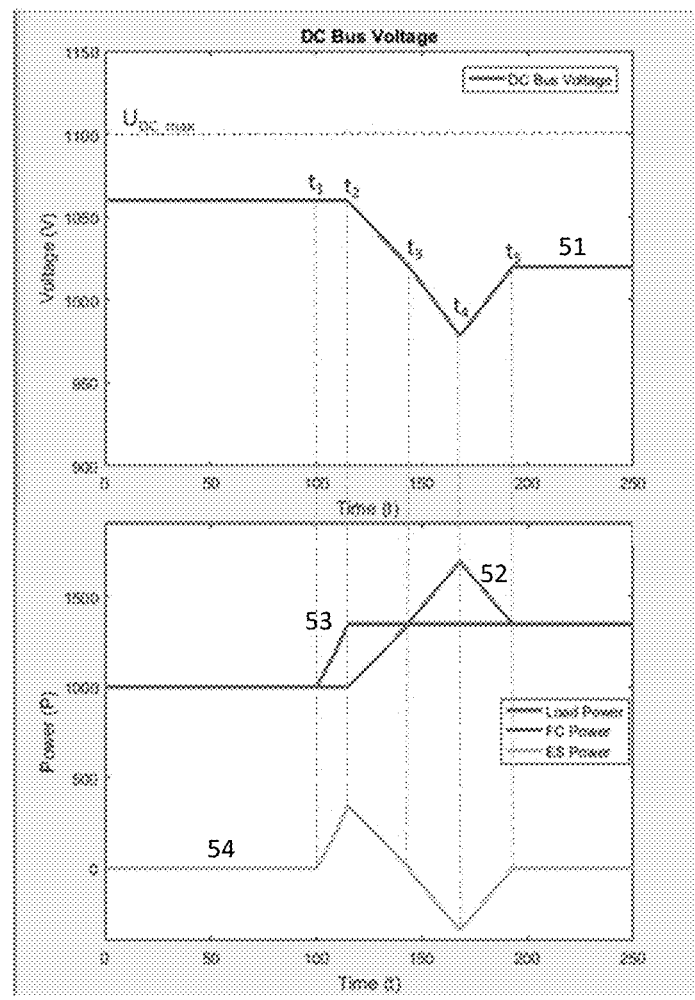
FIG. 4 shows an example of voltage waveforms in connection with the operation of the arrangement.

When operating in a steady state with a constant load, all the power fed to the load is generated by the fuel cell and the energy storage converter is not feeding any power. FIG. 4 shows an example of the operation of the system in connection with voltage waveforms of the system. The upper plot of FIG. 4 shows the upper voltage limit of the DC voltage bus UDC_max and DC bus voltage 51. The lower plot shows the power from the fuel cell 52, the load power 53 and power from the energy storage 54. The operation of the system is in steady state until time instant t1 where the load power increases. In steady state, the fuel cell is supplying all the power required by the load and therefore the waveforms of load power 53 and the fuel cell power 52 are overlapping. When the load increases (at t1), the energy storage converter keeps the DC voltage at a set value and power is fed from the energy storage to the load as indicated by the increased power from the energy storage 54. The energy storage can provide energy quickly to compensate for the changed condition. As the DC voltage is not changed, the power from the fuel cell is kept constant.

The load is increased until instant t2. At the same time instant t2 the power flow of the energy storage converter is detected, and the DC voltage reference 51 is lowered. The lowering of the DC voltage reference increases the power 52 which is taken from the fuel cell, and when the DC voltage reference is decreased, the fuel cell produces again all the power required by the load and the power of the energy storage decreases to zero.

In the example illustrated by FIG. 4, the voltage reference is decreased to charge the energy storage. The power from the energy storage 54 has a negative value starting from instant t3 meaning that power is fed from the fuel cell to the energy storage. At time instant t4 it is considered that the energy storage has enough charge and the voltage reference is ramped back to a value in which the power of the energy storage converter is zero. A new steady state operation is achieved at time instant t5 and the energy storage is charged.

The DC voltage reference is not changed instantly when power flow from the energy storage is detected. The voltage reference is preferably changed after a predetermined time delay after the detection of the power flow or after the charge of the energy storage has changed for a certain amount.

The DC voltage reference given to the energy storage converter is preferably changed linearly such that the reference has a maximum slope such that the dynamics of the fuel cell can deal with the change.

According to an embodiment, the DC to DC converter connected between the fuel cell and the DC voltage is a buck-boost converter which is operated such that when the voltage of the fuel cell is higher than the upper limit of the DC voltage bus, the fuel cell converter is used to lower the voltage to an acceptable value, which is preferably the upper limit of DC voltage bus. Further, the buck-boost converter used as fuel cell converter is operated to boost the voltage when the voltage of the fuel cell is lower than the lower limit of the DC voltage bus. The voltage from the fuel cell is preferably boosted to a value which is preferably the lower limit of DC voltage bus. The voltage range limited by the upper limit and the lower limit enable that devices connected to the DC bus can be operated without exceeding the rated values of the devices. When the voltage of the fuel cell is within the limits, the voltage is floating freely and the fuel cell is connected to the DC bus directly.

Figure 3:
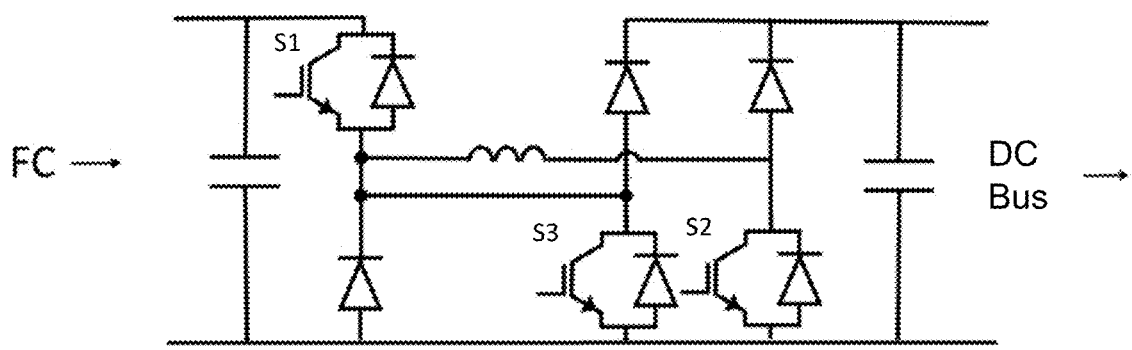
FIG. 3 shows an example of a DC to DC converter employed in connection with fuel cells.

FIG. 3 shows an example of a buck-boost converter which enables to both increase and decrease the voltage from the fuel cell to the DC bus. Further, the converter enables to connect the fuel cell directly to the DC bus when the voltage of the fuel cell is within the limits. In FIG. 3, switch S1 is controlled to a conducting state for connecting the voltage of the fuel cell FC directly to the DC bus. When switch S1 is modulated, the converter is operated in buck mode. Further, when switch S2 is modulated and S1 is conducting, the converter operates in boost mode.

The method is applicable in isolated surroundings in which alternating current power grid is not available, for example. Examples of such an isolated surrounding is a vessel, a ship or a vehicle. In a ship or a vessel the method and the arrangement provides a DC voltage distribution system in which loads can be served with power which is obtained from fuel cells with increased efficiency. In the example of FIG. 2, the DC voltage distribution system is shown in connection with a vessel or a ship in which load 24 is a propulsion system fed by an inverter 24 and load 23 comprises consumers which require alternating voltage with a fixed frequency. The fixed frequency can also be provided with an inverter 30. The load 23 is shown as a transformer, which may also be connected to the output of an inverter for lowering the voltage level. Further, FIG. 2 shows some voltage ranges which can be used in connection with method and arrangement. The operating voltage range of the fuel cells is shown to be from 700 volts to 1100 volts and the DC bus voltage range is shown to be from 700 volts to 850 volts. The provided examples indicate that during low loads, the voltage of the fuel cells require lowering such that the voltage connected to the DC bus is 850 volts. Further, as the lowest operation range of the fuel cells is 700 volts it equals to the lowest value of the DC bus voltage. Thereby the fuel cell converter does not require any boost function.

The DC voltage reference to the energy storage controller is provided preferably from a power management controller or from a similar upper level controller. The same power management controller also obtains measurements which are needed to produce the DC voltage reference. These measurements may include current of the energy storage converter or charge level of the energy storage, for example.

Figure 5:
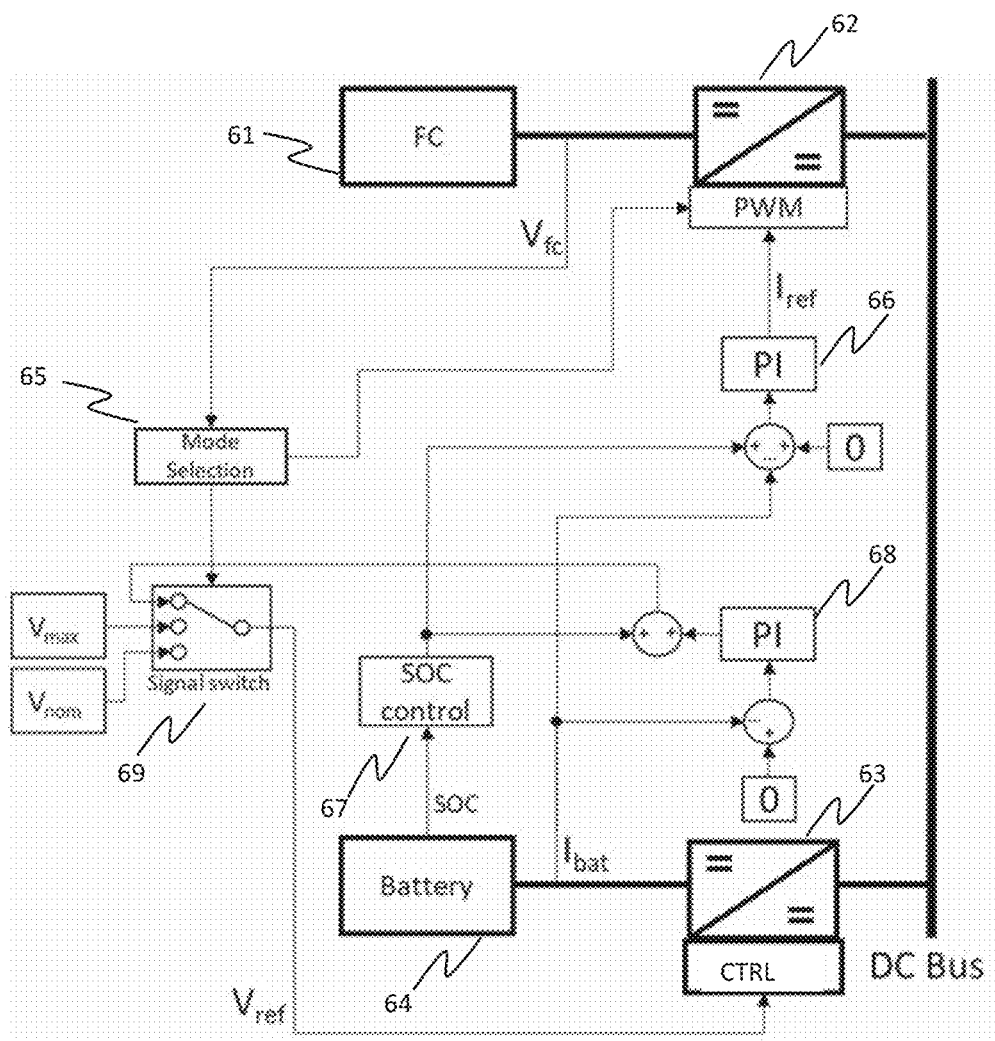
FIG. 5 shows an example of a control system applicable in connection with the present disclosure.

FIG. 5 shows an example of a control system which can be used to control the operation of a DC voltage distribution system. For simplicity, the block diagram of FIG. 5 contains only one FC and one energy storage as power sources. The energy storage in the example is shown as a battery 64. The fuel cell DC to DC converter 62 is operated in current control mode and the energy storage DC to DC converter 63 is operated in voltage control mode. In case more fuel cells are connected to the same DC bus, the voltage measurement of each fuel cell needs to be considered for mode selection. Fuel cells are loaded symmetrically, meaning that each fuel cell DC to DC converter is given the same current reference, $I_{ref}$. In case more energy storages, such as batteries, are connected to the same DC bus, each energy storage DC to DC converter is given the same voltage reference, $V_{ref}$. Also, instead of using current measurement of one battery, $I_{bat}$, the sum of current measurements from all batteries is used. The operation of load drives does not affect DC bus voltage control method and therefore load drives are omitted from FIG. 5.

In the example of FIG. 5, three operation modes exist based on the fuel cell voltage, $V_{fc}$. These operation modes define the manner the fuel cell DC to DC converter is operated and how DC bus voltage reference is obtained. Minimum and maximum DC bus voltages ($V_{dc\_min}$ and $V_{dc\_max}$) are set to not compromise the system operation at any point. In mode selection block 65, operation mode of the fuel cell converter 62 is chosen based on the fuel cell voltage $V_{fc}$. When $V_{fc} > V_{dc\_max}$, buck mode is used. In this mode, the voltage reference $V_{ref}$ given to the battery DC to DC converter is $V_{max}$. In the example, a signal switch 69 is shown to select the voltage reference $V_{ref}$ based on the fuel cell voltage. A first PI controller 66 is used to obtain the current reference $I_{ref}$ for the fuel cell DC to DC converter. The first PI controller 66 is tuned to be slow so that the battery will always first react to load dynamics and fuel cell only supplies the base load to the DC bus.

A state of charge (SOC) controller 67 is also added to monitor the SOC level of the energy storage 64 and give a positive offset to $I_{ref}$ in case SOC value of the energy storage falls below allowed minimum SOC value. The offset to $I_{ref}$ is negative, in case SOC level exceeds maximum allowed SOC value.

When $V_{dc\_min} \leq V_{fc} \leq V_{dc\_max}$, freewheeling mode of the fuel cell converter is used. In this mode, the fuel cell DC to DC converter 62 is uncontrolled and fuel cell current flows freely to the DC bus. $V_{ref}$ to battery DC to DC converter 63 is controlled via a second PI controller 68 to keep the battery current zero. This PI controller is also tuned to be slow to avoid sudden voltage variations which would be seen by the fuel cell as load steps. Although in this mode fuel cell current is left uncontrolled by the fuel cell DC to DC converter 62, it will still be controlled by adjusting the DC bus voltage, as was described above. The SOC controller 67 adds a negative offset to $V_{ref}$ in case battery SOC falls below allowed minimum SOC value and a positive offset in case battery SOC exceeds maximum allowed SOC value.

When $V_{fc} < V_{dc\_min}$, Boost mode is used in the fuel cell converter 62. In this mode, the fuel cell DC to DC converter 62 is again controlled via the first PI controller 66 same way as in buck mode. The voltage reference given to the energy storage DC to DC converter is $V_{nom}$. The reason for using $V_{nom}$ instead of $V_{dc\_min}$ is that in this mode, the load is typically high and therefore the DC bus voltage level needs to be high enough. The SOC controller 67 works the same way as in buck mode. The current reference is shown to be fed to a PWM (pulse width modulation) block in connection with the converter 62. The PWM block produces suitable switch commands to the converter depending on the operation mode. In connection with the energy storage converter the 63, the voltage reference is fed to a control block. This control block operates the switches of the converter 63 to control the DC to DC converter in a desired manner. The topologies of the converters 62, 63 are not fixed to any certain topology.

Although the load is not shown in connection with FIG. 5, the load may be, for example, a combination of a propulsion drive and a consumer load of a vessel.

The energy storage used in the present disclosure may be a battery, a super capacitor or any similar device which stores electrical energy.

It will be obvious to a person skilled in the art that, as the technology advances, the inventive concept can be implemented in various ways. The invention and its embodiments are not limited to the examples described above but may vary within the scope of the claims.

The invention claimed is:

1. A method of controlling a DC voltage distribution system, the DC voltage distribution system comprising:
   a DC voltage bus,
   a fuel cell electrically connected to the DC voltage bus,
   an energy storage and an energy storage converter, wherein the energy storage converter is a bi-directional DC to DC converter, and wherein the input of the energy storage converter is connected to the energy storage and the output of the energy storage converter is connected to the DC bus,
   wherein the method comprises:
      determining a DC voltage reference for the DC voltage bus, the energy storage converter controlling, based on the DC voltage reference, a voltage of the DC voltage bus by providing power from the energy storage to the DC bus or to the energy storage from the DC bus,
      determining, based on a measurement associated with the energy storage, whether a direction of power flow between the energy storage converter and the energy storage is towards the energy storage or towards the energy storage converter, and
      changing the DC voltage reference on the basis of the detected power flow between the energy storage converter and the energy storage to change the power taken from the fuel cell, wherein changing the DC voltage reference comprises:
         as a response to the direction of the power flow being from the energy storage converter towards the energy storage, raising the DC voltage reference so power provided by the fuel cell decreases; and
         as a response to direction of the power flow being from the energy storage to the energy storage converter, lowering the DC voltage reference so the fuel cell provides increased power,
      wherein the power flow between the energy storage and the DC voltage bus changes in response to changes in a load on the DC voltage bus.

2. The method according to claim 1, wherein the DC voltage reference is further changed to charge the energy storage.

3. The method according to claim 2, wherein the DC voltage distribution system comprises a fuel cell converter, wherein the input of the fuel cell converter is connected to the fuel cell and the output of the fuel cell converter is connected to the DC voltage bus.

4. The method according to claim 3, wherein the fuel cell converter is operated to convert the fuel cell voltage to a lower value when the voltage of the fuel cell is above an upper limit set for the DC voltage of the DC voltage bus.

5. The method according to claim 1, wherein the DC voltage distribution system comprises a fuel cell converter, wherein the input of the fuel cell converter is connected to the fuel cell and the output of the fuel cell converter is connected to the DC voltage bus.

6. The method according to claim 5, wherein the fuel cell converter is operated to convert the fuel cell voltage to a lower value when the voltage of the fuel cell is above an upper limit set for the DC voltage of the DC voltage bus.

7. The method according to claim 6, wherein the fuel cell converter is operated to convert the fuel cell voltage to a higher value when the voltage of the fuel cell is below a lower limit set for the DC voltage of the DC voltage bus.

8. The method according to claim 5, wherein the fuel cell converter is operated to convert the fuel cell voltage to a higher value when the voltage of the fuel cell is below a lower limit set for the DC voltage of the DC voltage bus.

9. The method according to claim 1, wherein the DC voltage reference is changed after a time delay after detection of the power flow between the energy storage converter and the energy storage.

10. A DC voltage distribution arrangement, the DC voltage distribution arrangement comprising:
    a DC voltage bus,
    a fuel cell electrically connected to the DC voltage bus,
    an energy storage and an energy storage converter, wherein the energy storage converter is a bi-directional DC to DC converter, and wherein the input of the energy storage converter is connected to the energy storage and the output of the energy storage converter is connected to the DC bus, and
    a controller configured to:
       determine a DC voltage reference for the DC voltage bus, the energy storage converter controlling, based on the DC voltage reference, a voltage of the DC voltage bus by providing power from the energy storage to the DC bus or to the energy storage from the DC bus,
       determine, based on a measurement associated with the energy storage, whether a direction of power flow between the energy storage converter and the energy storage is towards the energy storage or towards the energy storage converter, and
       change the DC voltage reference on the basis of the detected power flow between the energy storage converter and the energy storage to change the power taken from the fuel cell, wherein changing the DC voltage reference comprises:
          as a response to the direction of the power flow being from the energy storage converter towards the energy storage, raising the DC voltage reference so power provided by the fuel cell decreases; and
          as a response to direction of the power flow being from the energy storage to the energy storage converter, lowering the DC voltage reference so the fuel cell provides increased power,
       wherein the power flow between the energy storage and the DC voltage bus is adapted to change in response to changes in a load on the DC voltage bus.

11. The DC voltage distribution arrangement according to claim 10, wherein the controller is configured to change the DC voltage reference after a time delay after detection of the power flow between the energy storage converter and the energy storage.

* * * * *